J. F. WAGNER.
JUNCTION BOX.
APPLICATION FILED AUG. 28, 1911.

1,090,805.

Patented Mar. 17, 1914.

Witnesses:
Ed. Kent.
Daniel B. Nye

Joseph F. Wagner.
Inventor.
By George J. Oltsch.
Attorney

UNITED STATES PATENT OFFICE.

JOSEPH F. WAGNER, OF SOUTH BEND, INDIANA, ASSIGNOR TO ARNOLD-WAGNER ELECTRIC CO., OF SOUTH BEND, INDIANA, A CORPORATION OF INDIANA.

JUNCTION-BOX.

1,090,805.   Specification of Letters Patent.   Patented Mar. 17, 1914.

Application filed August 28, 1911.   Serial No. 646,348.

*To all whom it may concern:*

Be it known that I, JOSEPH F. WAGNER, a citizen of the United States, residing at South Bend, in the county of St. Joseph and State of Indiana, have invented certain new and useful Improvements in Junction-Boxes, of which the following is a specification.

My invention relates to improvements in junction boxes of the type commonly used in equipping a building with an electric lighting system, and particularly of that type which is mounted in the wall of a room to receive and support a switch for controlling the current.

The object of my invention is to improve the construction of such boxes in a manner which will permit the same to be more easily and quickly installed, and to obviate the necessity of placing cross-bars between joists for the support of the box, as is the present practice, thereby relieving the electrician from doing carpenter work preliminary to the installation or mounting of the boxes.

A further object of the invention resides in the provision of means in connection with a junction box, whereby the nail or screw supporting the rear end of the box may first be placed, after which the holding means on the rear end of the box may be passed over such nail or screw and the box adjusted, if required, in an endwise direction before fastening the front end thereof, so that the front edge of the box will be properly spaced from the joist to which it is secured in order to come flush with the finished wall.

With these and other objects in view, the present invention consists of certain novel features of construction, hereinafter more particularly described and pointed out in the claims, and illustrated in the accompanying drawings, it being understood that minor changes of construction may be made without departing from or sacrificing any of the advantages of the invention.

Figure 1:
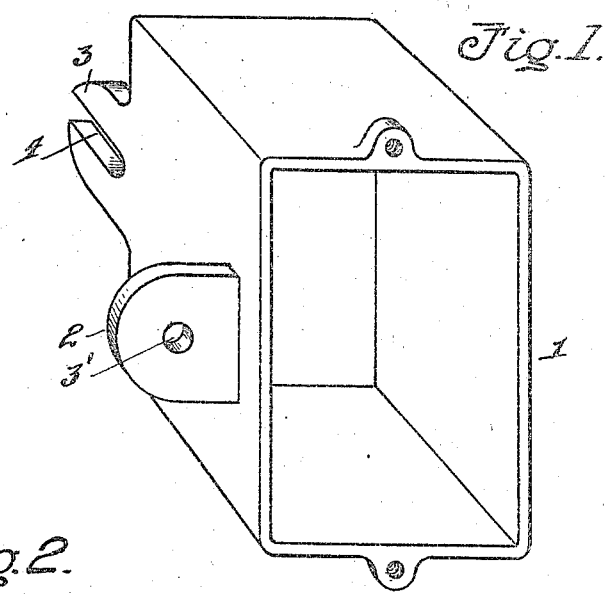
Figure 2:
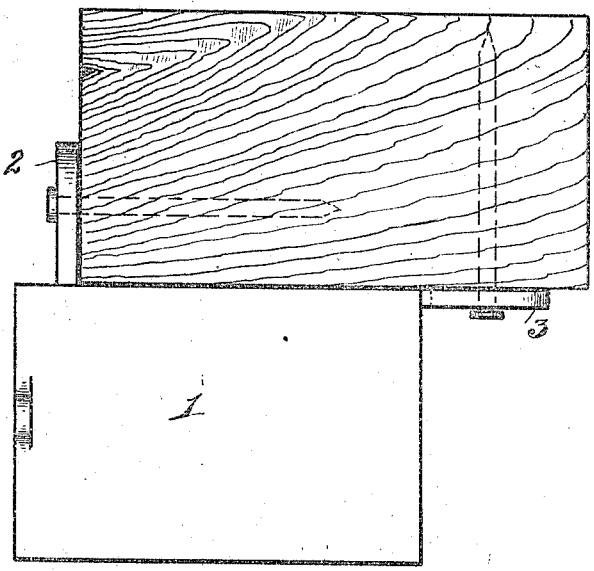

In the accompanying drawings, which illustrate the preferred embodiment of my invention—Figure 1 is a perspective view of a junction box, and Fig. 2 is an end view of a joist showing the manner of attaching the junction box thereto.

Referring now more particularly to the accompanying drawings, the junction box 1, which is of the form commonly in use, is provided with an open front end to permit access to be had thereinto for placement of the switch (not shown), for which such boxes are mainly used, and for making the connections therewith in the usual manner, openings (not shown) being formed in the walls of the box in any suitable manner, through which the conduits are passed containing the wire conductors for connection with the switch, all of which is well understood in the art.

Extending laterally from one of the side walls of the junction box, and preferably formed integrally therewith, is a lug 2, provided with a nail or screw hole 3', the lug being spaced a distance from the front end of the box equaling the customary thickness of the lath and plaster of the finished wall, so that the front edge of the box will come flush with the surface of the wall, and the cover plate (not shown) will have a close fit with the wall when attached to the box. Forming a continuation of the side wall from which the lug 2 projects, is a lug 3, provided with an open-ended slot 4, said lugs being disposed at right angles with relation to each other, so that the box may be attached to a joist or other timber by driving a nail or screw through the openings in the lugs in the manner plainly shown in Fig. 2. It will thus be observed that a single joist or timber is sufficient for properly mounting the box, and that no special frame or supporting structure is required for the purpose, as is necessary for mounting boxes in present use, thus effecting a material saving of time and labor in the installation of the same. When installing the box in an old house being wired for electricity, or in a house in the process of construction in which one side of the wall is partially or completely finished, so that there is not sufficient room between the rear end of the box and the wall to permit access to be had therebetween for the purpose of driving the fastening means through the slotted lug into the joist, such fastening means may first be driven into the joist and the box then positioned by passing the slotted lug over the same, and then securing the laterally extending lug 2 to the front exposed edge of the joist by driving a nail or screw through the opening therein into the joist. Furthermore, should it be desired to mount the box so as to come flush with the plaster, as in wiring an old house in which the thickness of the lath and plaster may be greater than the space between the lug 2 and end of the box, the box may be moved outwardly the proper distance so as to come flush with the plaster, the slot 4 in the rear lug permitting this to be done without disturbing the previously placed nail or screw for holding said lug, and by placing a liner between the front lug and the joist and then driving the nail or screw therethrough, a perfect adjustment may be had between the front edge of the box and the wall without the employment of any adjustable lugs or fastening members in connection with the box. A further material advantage resides in the arrangement of the lugs in the relative positions disclosed, in that it permits the box to be secured to either side of a joist, a half turn of the box bringing the same in the proper position for either side.

I have thus produced an exceedingly simple structure for an article of the character described, and which, by virtue of the novel arrangement of and form of the lugs, is adapted to meet all of the requirements necessary to permit the box to be handily and rapidly installed, thus effecting a material saving of time and labor; and, as compared with junction boxes employing lugs or fastening members adjustable with relation to the box, a material saving in the manufacturing cost also.

What is claimed is:—

1. A junction box comprising integrally formed lugs, one of which lugs extends laterally from one of the side walls thereof, and the other forming a continuation of the side wall from which the first mentioned lug extends and provided with an open-ended slot therein, substantially as and for the purpose described.

2. A junction box comprising side walls and a rear wall with the front end of the box being open, a lug extending laterally from one of the side walls and spaced from the open end of the box, said lug having an opening in its free end, a second lug projecting from the rear end wall, said second lug being a prolongation of the side wall carrying the first-mentioned lug, and said second lug having an open-ended slot in its free end.

In testimony whereof I affix my signature in presence of two witnesses.

JOSEPH F. WAGNER.

Witnesses:
 DANIEL B. NYE,
 GEORGE OLTSCH.